J. Pool,
Automatic Gate.
No. 111,670.  Patented Feb. 7, 1871.
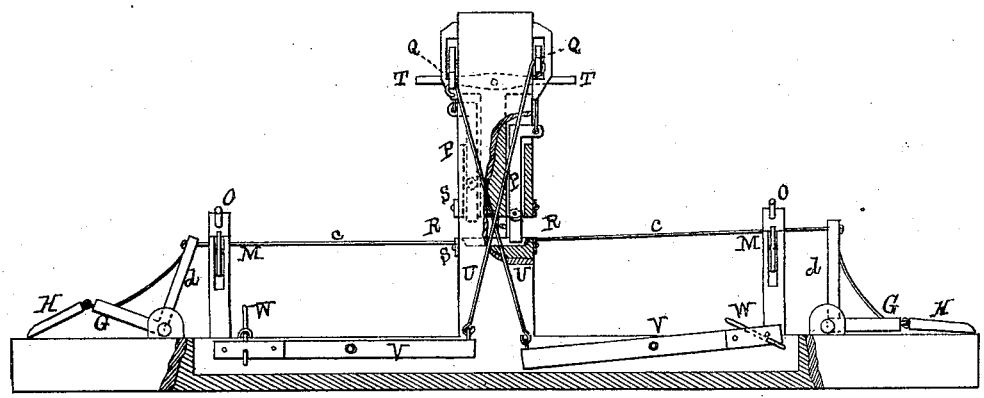
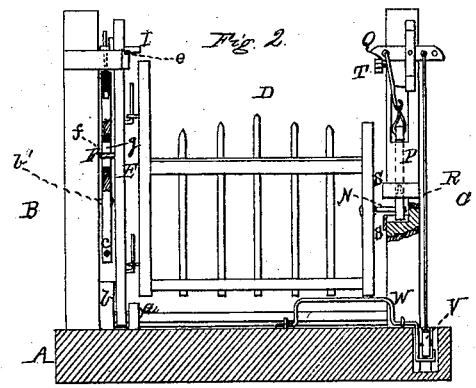
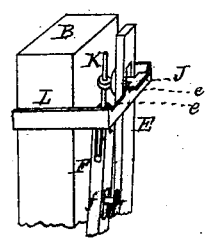
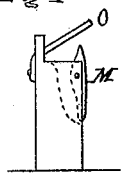
Witnesses  Inventor.

United States Patent Office.

JOHN POOL, OF ELIZABETH CITY, NORTH CAROLINA.

Letters Patent No. 111,676, dated February 7, 1871.

IMPROVEMENT IN GATES.

The Schedule referred to in these Letters Patent and making part of the same.

*To all whom it may concern:*

Be it known that I, JOHN POOL, of Elizabeth City, in the county of Pasquotank and State of North Carolina, have invented new and useful Improvements in Gates; and I do hereby declare the following to be a clear and exact description of the nature thereof, sufficient to enable others skilled in the art to which my invention appertains to fully understand and use the same, reference being had to the accompanying drawing making part of this specification, in which—

Figure 1 is a longitudinal view, partly in section, of the gate illustrating my invention.

Figure 2 is a transverse view, partly in section.

Figures 3 and 4 are views of detached parts.

Similar letters of reference indicate corresponding parts in the several figures.

This invention is an improvement in the gate for which Letters Patent were granted to me July 12, 1870, and numbered 105,366.

It consists in hinging or hanging the gate to a rocking-beam, which is operated by an oscillating lever, through the medium of the platforms and intermediate connections, and having a latch so combined with the rocking-beam as that the gate will shut with certainty.

It also consists in a notched band, which operates in connection with the aforesaid latch.

It also consists in the arrangement, above the latches which hold the gate open, of inclined rods, against which the bolt of the gate strikes when the gate is raised for shutting purposes, so as to give a propelling force toward closing.

It also consists in the combination of various parts, as will be hereafter set forth.

In the drawing—

A may represent a flooring or the ground, to which are secured, or in which are implanted, the gate-post B and latch-post C.

D represents the gate proper, which may be of any form and construction, and is hung to a rocking-beam, E, whose lower end is hinged to a block or post arising from the ground or flooring A.

A washer, b, may be inserted between the gate-post B and the beam E, in order to separate them and provide a free space for the oscillations of a lever, F, which is hinged, as at b', to the gate-post B, and receives motion from rods c c, which extend from posts d d, secured to the hinged platforms G G, which are depressed by the weight of the person, vehicle, or animal passing over them.

Aprons H H are hinged to the platforms, to facilitate ascent thereto.

At the top of the rocking-beam, I arrange a latch, J, which, by preference, is of T-shape, and has an eye at the rear or bottom, through which passes a pin, K, which is jointed to the upper end of the oscillating beam E.

A band, L, is secured to the upper portion of the gate-post B, and is so shaped or bent, as to surround the upper end of the beam E, and form a bearing for the head of the latch J.

Notches *e e* are formed on the upper edge of the band, for purposes to be presently explained.

In the oscillating lever F I provide a mortise, *f*, into which projects and plays a pin, *g*, secured to the rocking-beam E.

It will be seen that the depression of the platforms will move the oscillating lever F. This moves the rocking-beam E, and throws the gate out of center by means of the pin *g* on said beam acting against the lever in the mortise *f*. The pin has vertical and lateral play in said mortise, in order to give the required motion to the T-latch at the proper time. If the play is one inch, then the lever will move one inch before it begins to move the beam. This independent motion raises the T-latch out of the notch on the band L before the beam is required to move, and thus releases it from the catch or hold which the latch gives it.

This is the operation of starting, but as the beam moves to the other side of the band, the latch turns and also moves. It then catches in the notch on the other side of the band, and thereby holds the beam in its new position until the oscillating lever is again moved in the opposite direction; then it raises the latch and releases the beam, as it did on the other side, before the beam is moved. This feature of the latch and its operation is necessary to shut the gate with certainty.

If a conveyance or otherwise, passing, should stop on one of the platforms and remain until the gate is shut, the latch would not be necessary; but when a conveyance or otherwise passes quickly over the platform, (the gate being open,) and leaves it before the gate is well advanced toward closing, the weight of the gate will throw back the beam on which it is hung, and the gate thus fails to close unless caught or held by the T-latch, as stated.

It is desirable that the hinged pin on the top of the oscillating beam should pass freely through the eye in the T-latch, in order to prevent jamming of the parts.

M represents the catch-latches, which operate similarly to those shown in my former Letters Patent. Upon the gate opening, its bolt N strikes one of the said latches M, which "gives," so that the bolt rides over it and then drops behind it.

In closing the gate, it is raised clear of the latch by the operation of the platform, beam, lever, and connecting parts, and in order to assist and insure the operation of shutting, I arrange above the latch catches M, upwardly and forwardly-projecting rods O, the use of which is as follows:

When the gate is raised, in order to be closed, its bolt N strikes against one of the inclined rods, which gives it a quick propelling force toward closing. This will be found especially useful when the wind sets strongly against the closing of the gate. Thus the rising of the gate in starting to close is made available to give it a quick and forcible thrust forward.

In the post C there are located the latches P, which hold the gate in a closed state. Each latch consists of two pieces hinged together, the upper piece of which, being connected to a piece of wire, cord, or otherwise, to levers Q, which are pivoted to the sides of the post C. The lower pieces or feet extend into the way R, which is cut or formed in the post for the passage of the bolt N of the gate, and the ends drop into sockets at the base of said way, whereby the latches hold the gate firmly closed.

The upper and lower edges of the way are strengthened or reinforced by bands S, which are quite serviceable, owing to the tendency of the wood-work around and about the way R to break away, in consequence of the strain thereon.

The feet of the latches swing inwardly, so that they offer no resistance to the bolt of the gate when the latter closes, but hold it from opening, unless the latches are raised. This is accomplished either by means of the levers Q, which may be operated by a lever, T, which is pivoted to the inner side of the post C, so as to be within convenient reach of a person mounted or afoot; or by cross-rod U, connected to the levers V, which latter are arranged longitudinally with the base A, and pivoted thereto.

The outer ends of said levers V are raised by wheel-trips W, and may be weighted to insure the return of said levers to their normal position, that is, when the latches are down or closed.

The wagon-trips are hinged to the base A and to the levers V, and are so constructed and located that the wheels of vehicles will strike them and thus raise the respective latch, in order to open the gate.

It will thus be seen that persons on horseback, foot, or in conveyances, are enabled to open the gate without difficulty or inconvenience.

Having thus described my invention,

What I claim as new, and desire to secure by Letters Patent, is—

1. The oscillating lever F, carrying the latch J, in combination with the rocking-beam E, applied and operating together, substantially as and for the purpose described.

2. The band L, formed with notches c c, in combination with the latch J, jointed to the lever F, and operating in connection with the beam E, to which the gate is hinged, substantially as and for the purpose described.

3. The projecting rods O, in combination with the bolt N of the gate, substantially as and for the purpose described.

4. The wheel-trips W, platforms G, levers V, latches P, and hand-lever T, arranged and operating with the gate D, substantially as and for the purpose described.

The above signed by me this 31st day of November, 1870.

JOHN POOL.

Witnesses:
C. W. GRANDY, Jr.,
FRANK VAUGHAN.